(12) United States Patent
Hoover et al.

(10) Patent No.: US 11,766,963 B2
(45) Date of Patent: Sep. 26, 2023

(54) RECONFIGURABLE RECREATIONAL VEHICLE

(71) Applicants: Dennis Hoover, Elkhart, IN (US); Thomas L Ison, Dowagiac, MI (US)

(72) Inventors: Dennis Hoover, Elkhart, IN (US); Thomas L Ison, Dowagiac, MI (US)

(*) Notice: Subject to any disclaimer, the term of this patent is extended or adjusted under 35 U.S.C. 154(b) by 360 days.

(21) Appl. No.: 16/602,363

(22) Filed: Sep. 23, 2019

(65) Prior Publication Data

US 2021/0086684 A1    Mar. 25, 2021

(51) Int. Cl.
*B60P 3/34* (2006.01)
*B60P 3/36* (2006.01)

(52) U.S. Cl.
CPC .. *B60P 3/34* (2013.01); *B60P 3/36* (2013.01)

(58) Field of Classification Search
CPC .................. B60P 3/36; B60P 3/34; B60P 3/39
USPC .......... 296/156, 158, 164, 168, 26.04, 26.05
See application file for complete search history.

(56) References Cited

U.S. PATENT DOCUMENTS

| 4,685,719 A * | 8/1987 | Hanemaayer | B60P 3/36 296/156 |
| 4,854,245 A * | 8/1989 | Platzer | B60P 3/36 105/317 |
| 5,374,094 A * | 12/1994 | Smith | B60P 3/34 187/266 |
| 2014/0159410 A1* | 6/2014 | Rasmussen | A47C 17/34 296/24.33 |

FOREIGN PATENT DOCUMENTS

FR    2263123 A1 * 10/1975    ................ B60P 3/36

* cited by examiner

*Primary Examiner* — Joseph D. Pape
(74) *Attorney, Agent, or Firm* — Ryan M. Fountain

(57) ABSTRACT

A reconfigurable RV is provided, having a multi-section wall separating a living quarters and a garage, that wall being vertically adjustable by elevation of the living quarters floor to selectively move between multiple modes of use, including full down, loft, and full up. The vertical adjustment of the wall permits changes in the usable area of the garage floor, according to the ceiling height needed in the garage and living quarters concurrently.

4 Claims, 17 Drawing Sheets

RECONFIGURABLE RECREATIONAL VEHICLE

BACKGROUND OF THE INVENTION

The present invention relates to recreational vehicles ("RVs"), such as travel trailers, toy haulers, fifth wheel trailers, motor homes, and the like, having at least living quarters therein, and as otherwise defined by the Recreational Vehicle Industry Association, information about which can be found on the internet at www.rvia.org.

RVs are typically versatile vehicles which may be used for concurrently or separately hauling equipment, other vehicles, personal property, people, and animals. RVs are often used for camping and/or recreation, or as temporary living quarters for an extended period of time. As such, the removable contents of an RV can include camping equipment, other vehicles (such as gold carts, ATVs, race cars, dune buggies), chairs, tables, tents, bar-b-ques, small boats, ski and snowboard gear, etc. Because the utility of an RV can vary with the season, the hauling needs for the RV can vary annually. Because an RV can have a useful like extending over many years, the hauling needs for the RV can vary from year to year. Because an RV can be easily resold to other owners, the hauling needs for the RV can vary from owner to owner. Accordingly, it has been desirable for an RV to be to change its configuration in order to suit the needs of the user in a given situation.

For a variety of reasons, both structural and regulatory, RVs typically have a fixed exterior configuration when being moved along roads and highways. However, once the RV has been moved to the desired location of usage, its configuration can be altered, at least to some extent. Typically, this has been previously done by the use of full wall or partial wall "slide-outs," a wall portion of the RV which selectively moves outward to expand the useable interior space of the RV. This is a reconfiguration of the RV along the horizontal plane, to expand the useable floor area of the RV. When the RV is prepared for moving to a different location, the slide-out is then contracted back into the RV.

However, there are limits, both economic, practical and regulatory, with respect to the use of slide-outs. For example, certain governmental and/or camp site regulations can confine the number and size of slide-outs available for a given RV type by requiring the RV to stay within a given "noon footprint". Also, when camping, trees or other natural obstructions adjacent to the RV can limit the use of slide-outs as a practical matter. Further, slide-outs typically add substantially to the cost of manufacture and maintenance of an RV, and slide-outs are commonly the root cause of many RV warranty costs (due, for example, to rain leakage, misalignment of operating mechanisms, and the like). Further, slide-outs typically add substantially to the weight of an RV, either directly or indirectly, and thereby increase the fuel costs and vehicular requirements associated with moving the RV from location to location.

Other mechanisms have been used to attempt to increase RV versatility by reconfiguring the interior space without altering the noon footprint. For example, some RVs have been built with "pop-up" mechanisms which raise all or part of the roof structure of an RV. This is reconfiguration of the RV along the vertical plane, to expand the interior vertical height or ceiling of the RV. Such structures can, in effect, add a second floor for bunks, or a loft, or render otherwise unusable space useable for standing, seating, and/or sleeping. Pop-ups can, to some degree, improve fuel economy for towing vehicle by lowering the RV drag or wind resistance, particularly during higher speed travel along highways. However, pop-ups do not typically add floor area to the vehicle for hauling or storing equipment. Further, pop-ups typically are expensive to manufacture and maintain, and can be more susceptible a wide range of warranty costs, and can add significantly to the weight of an RV (thus, negating fuel economy gains from drag reduction).

It has also been suggested to use "slide-back" mechanisms to reconfigure the RV by altering its floor plan at the site of usage. Examples of these are shown in U.S. Pat. No. 8,864,206 and U.S. patent application Ser. No. 13/507,528. Such arrangements can be especially helpful in toy hauler design, where the travel trailer or motor home type of RV includes a rearward "garage" for hauling or storing another, secondary vehicle, such as an ATV or sandrail. Once at the desired location, a ramp door on the RV is lowered, and the secondary vehicle is driven out for independent operation. The garage portion of the RV, now being emptied, is not needed for the same purpose and would be "wasted space" within the RV. Accordingly, slide-back RV designs have a moveable wall that slides along a fixed track into the garage, coincident with the longitudinal axis of the RV, to shrink the floor area of the garage, and concurrently expand the floor area of a living room adjacent to the garage. This can be especially suitable where a vapor barrier needs to be established between the garage and the living quarters of the RV, for example, to restrict penetration of fuel fumes from the garage room into the kitchen or sleeping areas of the RV. It can also be helpful to have a rigid wall between the garage room of an RV and the sleeping or living areas of the RV to increase personal security and privacy during RV use, especially where multiple persons are using the RV for different purposes at the same time. However, slide-back mechanisms can be relatively expensive and add to the overall weight of the RV, with at least some of the attendant disadvantages of such. Further, slide-back mechanisms reconfigure the RV floor plan by permitting alternative selections of opposing use along the horizontal plane of the RV. They do not focus on concurrent use alternatives within that plane, and do not address the prospect of translating cross-planar potential functionality (such as, space defined in then vertical plane) into horizontal plane functionality.

It has been suggested to provide additional, alternative uses for a RV garage, by forming a portion of the garage ceiling as the bed platform in an adjacent living quarters, and then moving the ceiling upward when the bed is not being used or used to its full extent. This is shown in U.S. Pat. No. 10,046,690. However, that type of RV reconfiguration again focuses on alternative selections of opposing use, rather maintaining a form of concurrent use. Further, elevating the bed platform in that manner can preclude affirmative separation between the two adjacent rooms, leaving no fixed wall in place or vapor barrier. Moreover, since only a portion of the ceiling is moved, the full useable floor area of the garage does not benefit from the reconfiguration of the RV. Further, the operational mechanisms needed for such partial reconfiguration arrangements can be readily apparent by the using and can significantly detract from the aesthetic appeal of the RV. Further, any such exposed lift mechanisms can be a safety concern with respect to user interface.

Objectives of the Invention

Accordingly, a primary objective of the present invention is to provide improved floor plans for reconfigurable RVs. These improvements include providing such arrangements which:

a. are inexpensive to make,
b. increase the floor plan optimization, c. maintain adequate user safety,
d. minimize component weight,
e. increase storage areas and accessibility thereto,
f. increase feature accessibility and user comfort, and
g. increase the aesthetic appeal of the RV.

SUMMARY OF THE INVENTION

These and other objectives of the present invention are achieved by the provision of a reconfigurable RV having a multi-section wall separating a living quarters and a garage, that wall being vertically adjustable by elevation of the living quarters floor to selectively move between multiple modes of use, including full down, loft, and full up. The vertical adjustment of the wall permits changes in the usable area of the garage floor, according to the ceiling height needed in the garage and living quarters concurrently.

Other objects, advantages, and novel features of the present invention will become readily apparent from the following drawings and detailed description of certain preferred and alternative embodiments.

DETAILED DESCRIPTION OF PREFERRED EMBODIMENTS

Figure 1:
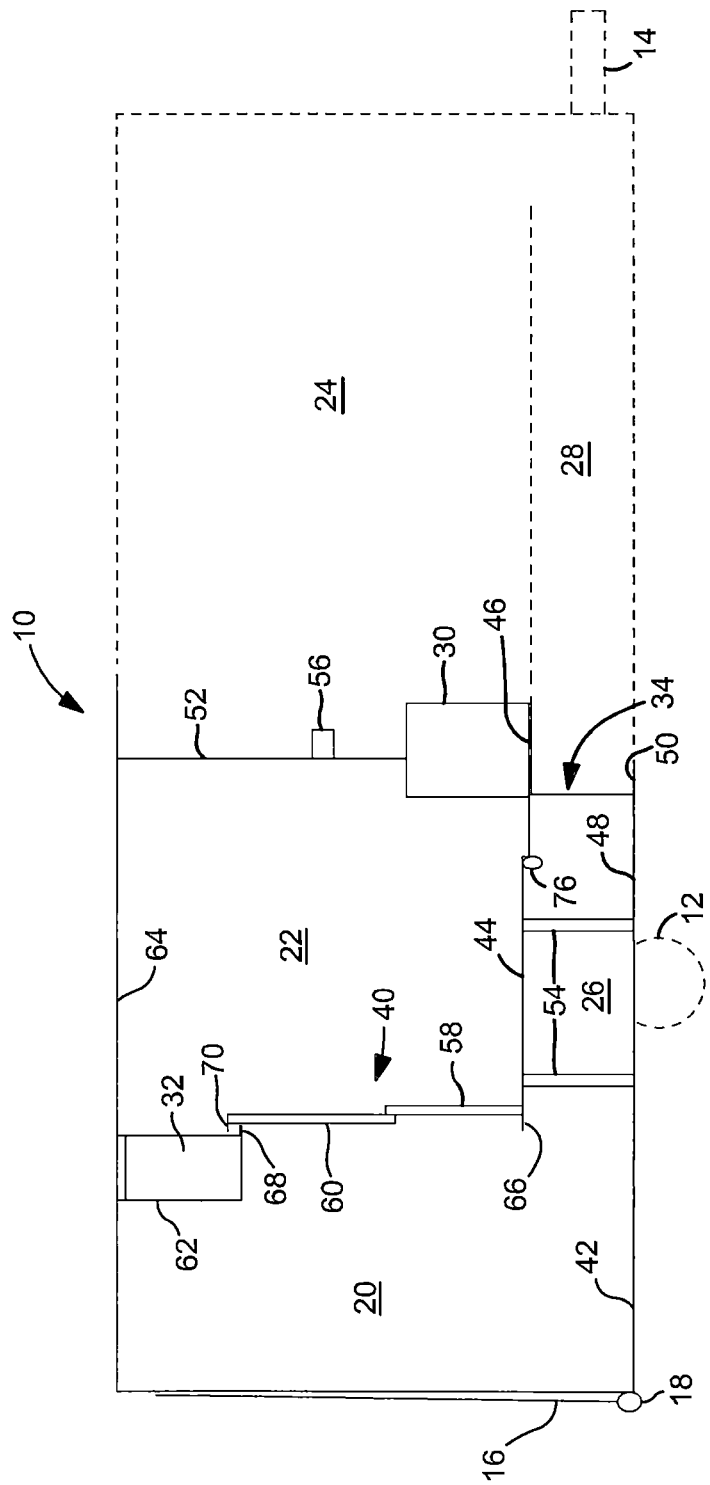
FIG. 1 is a right side schematic view of a RV according to the teachings of the present invention, with the living quarters floor just lifted from the full down position.
Figure 2:
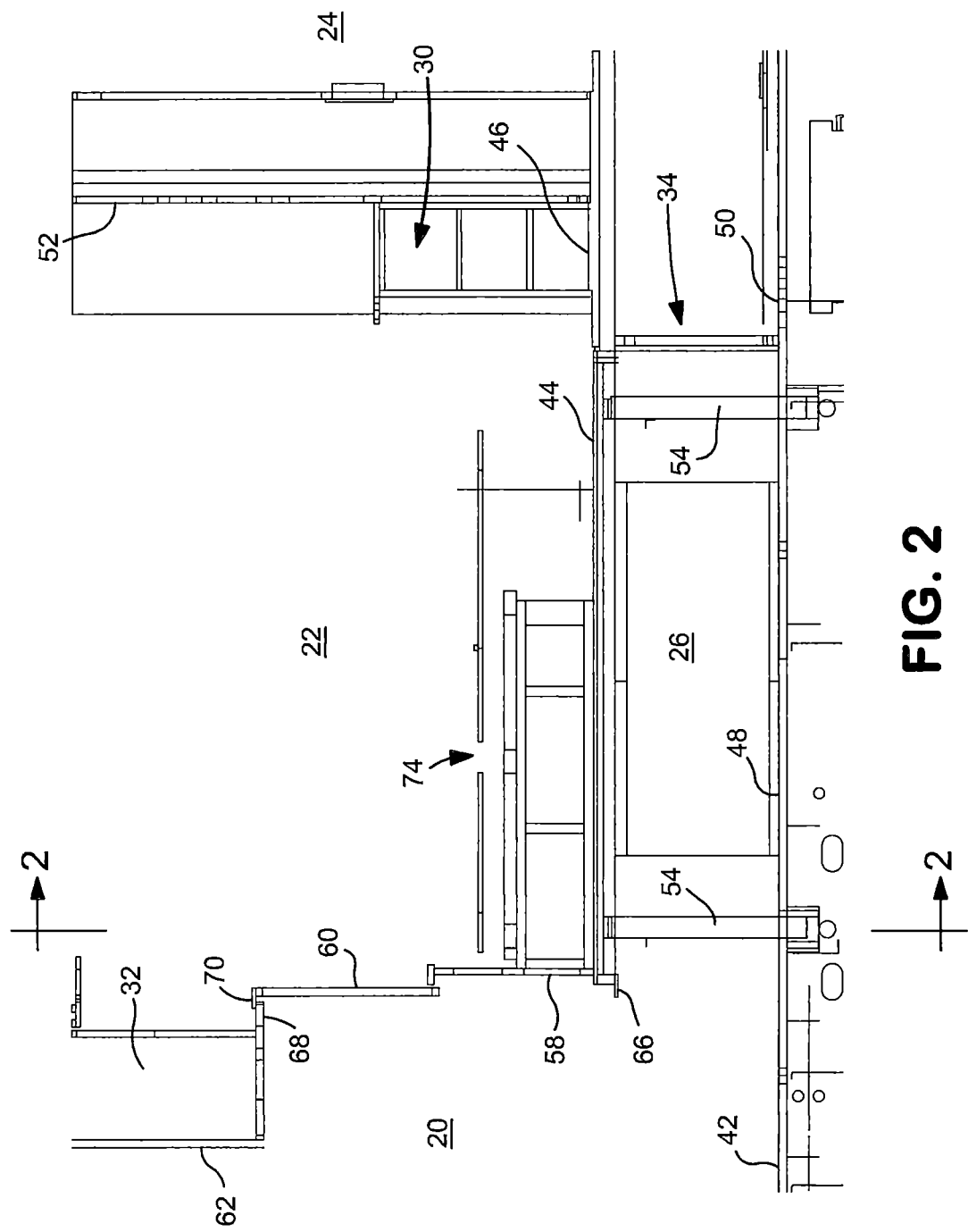
FIG. 2 is a cross-sectional, right side plan view of the interior of a RV according to the teachings of the present invention, with the living quarters floor in the full down position.
Figure 3:
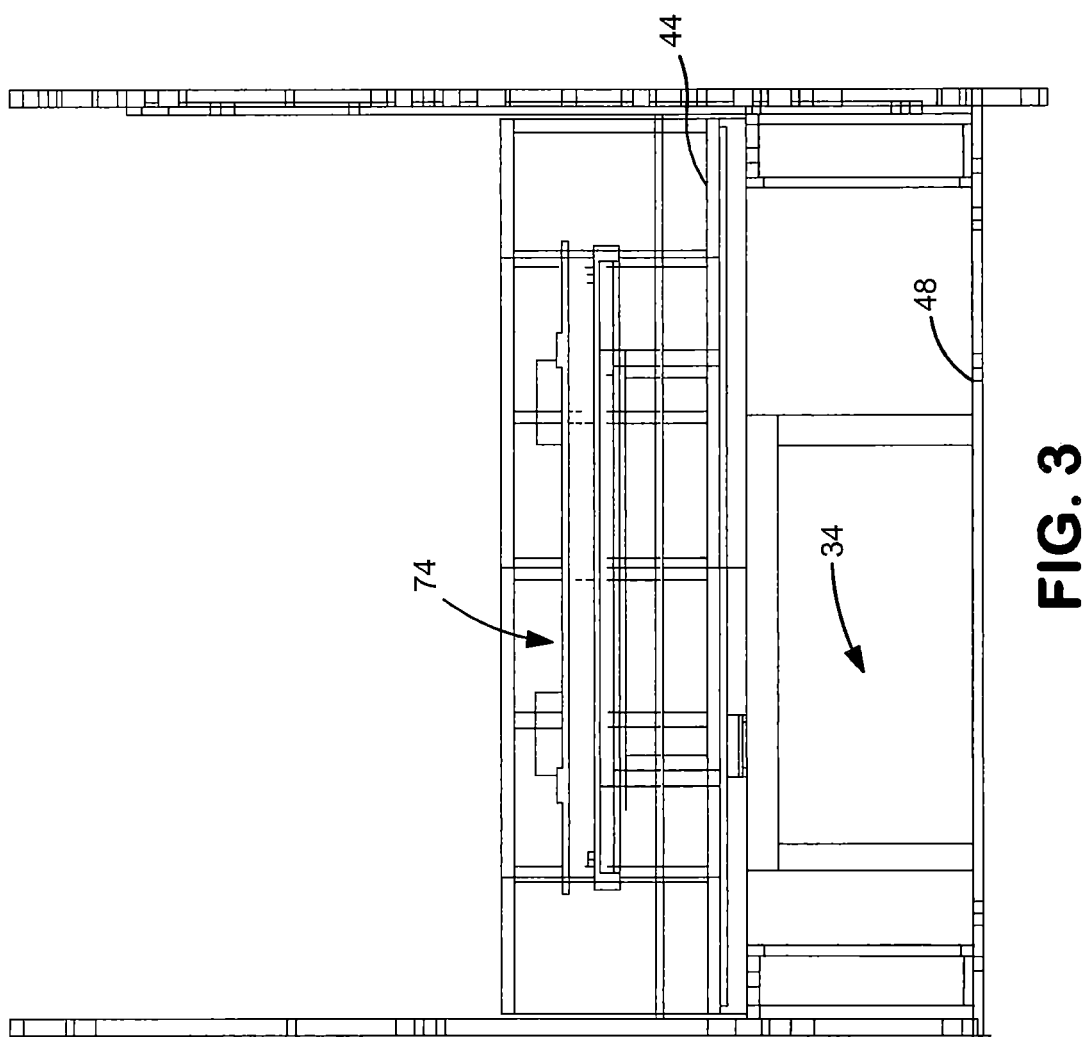
FIG. 3 is a cross-section end view along line 2-2 of FIG. 2.
Figure 4:
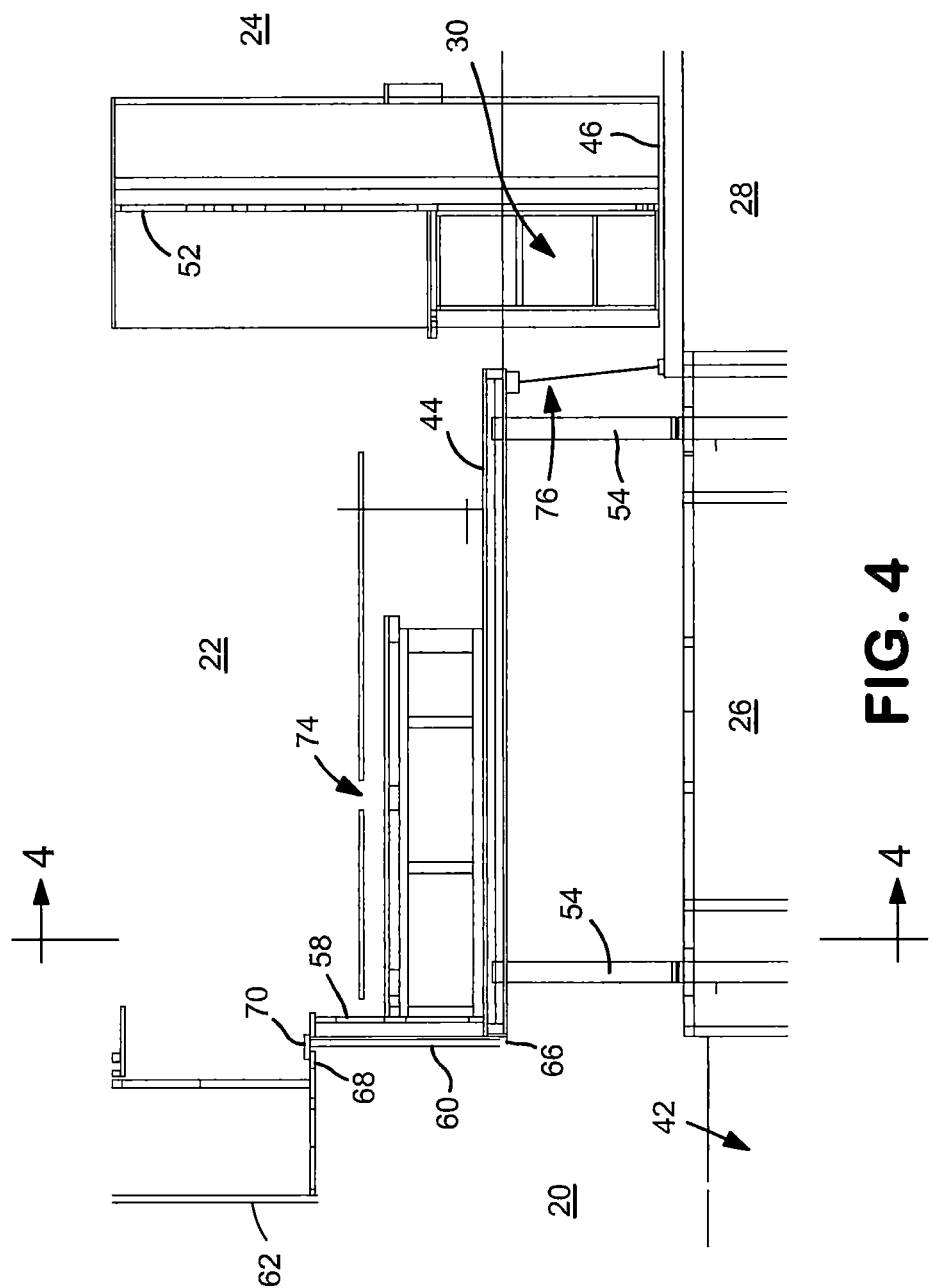
FIG. 4 is a cross-sectional, right side plan view of the interior of the RV of FIG. 2, with the living quarters floor lifted to the loft mode
Figure 5:
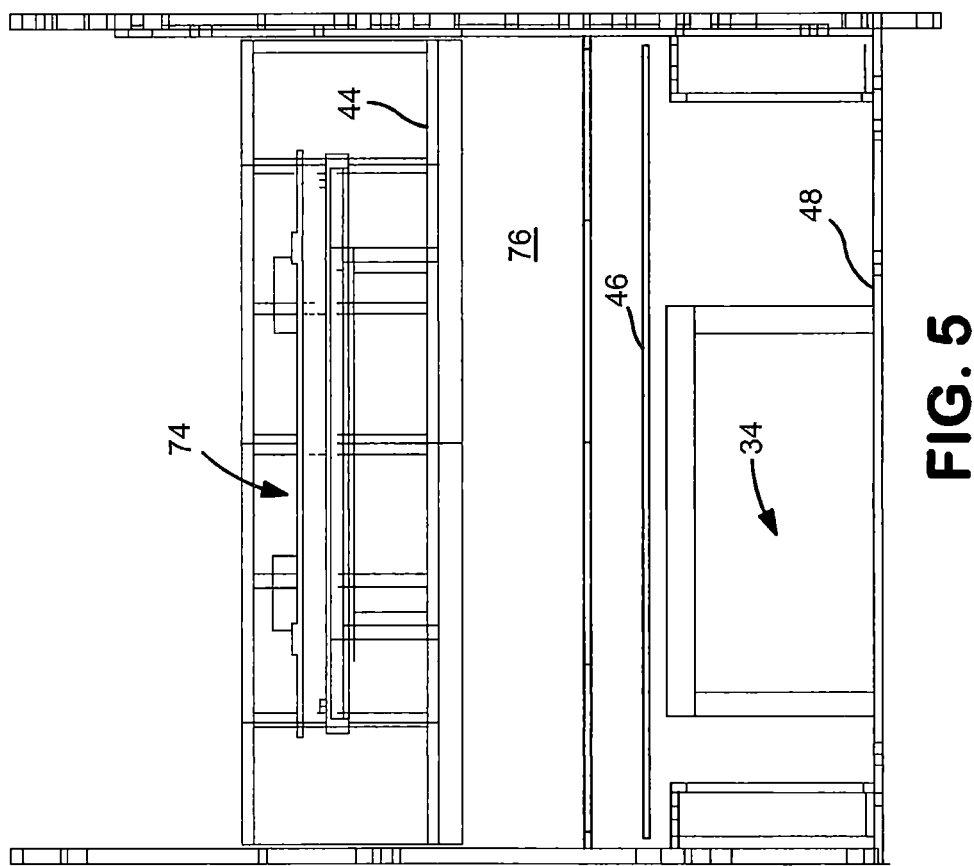
FIG. 5 is a cross-sectional view along line 4-4 of FIG. 4.
Figure 6:
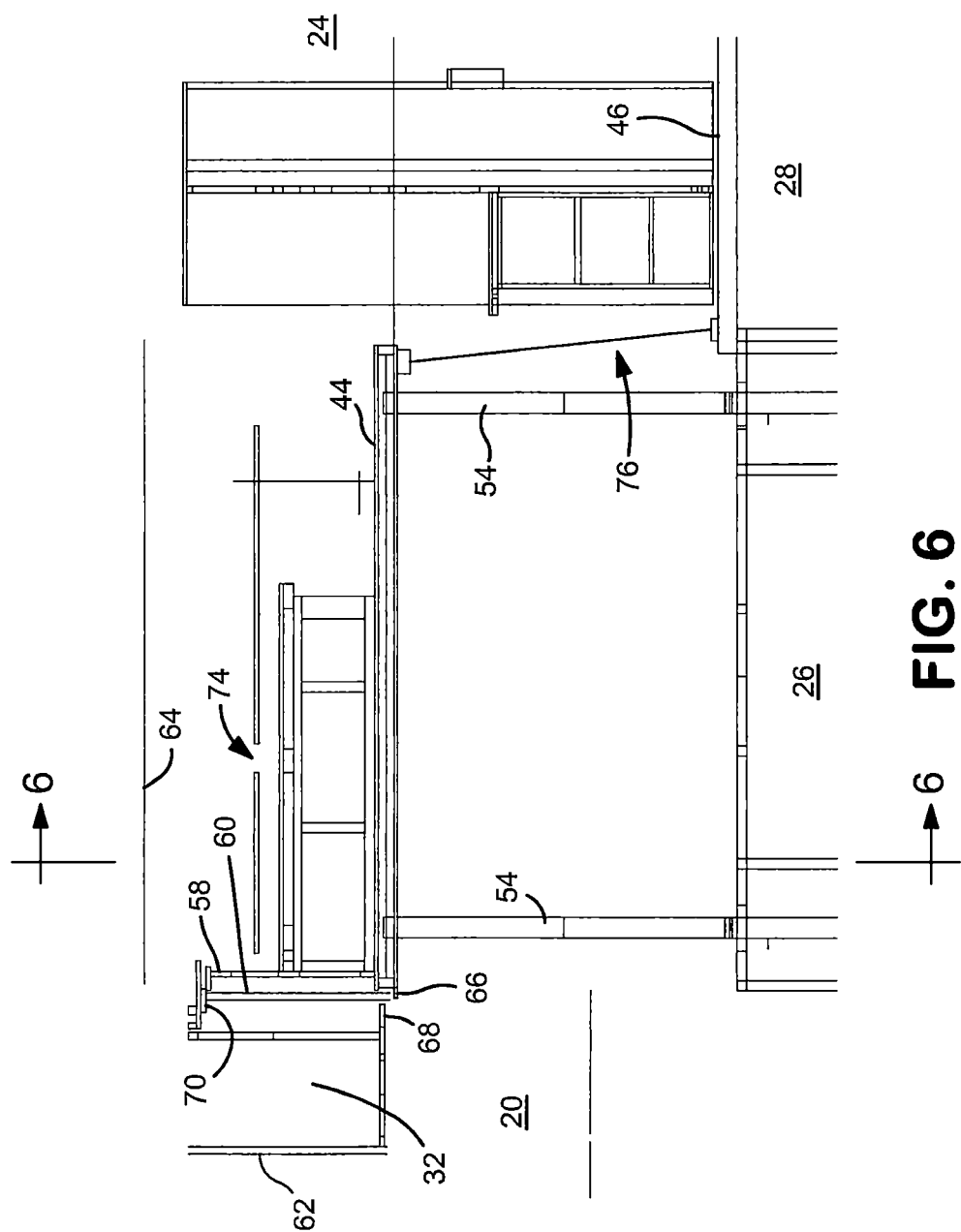
FIG. 6 is a cross-sectional, right side plan view of the interior of the RV of FIG. 2, with the living quarters lifted to the full up position.
Figure 7:
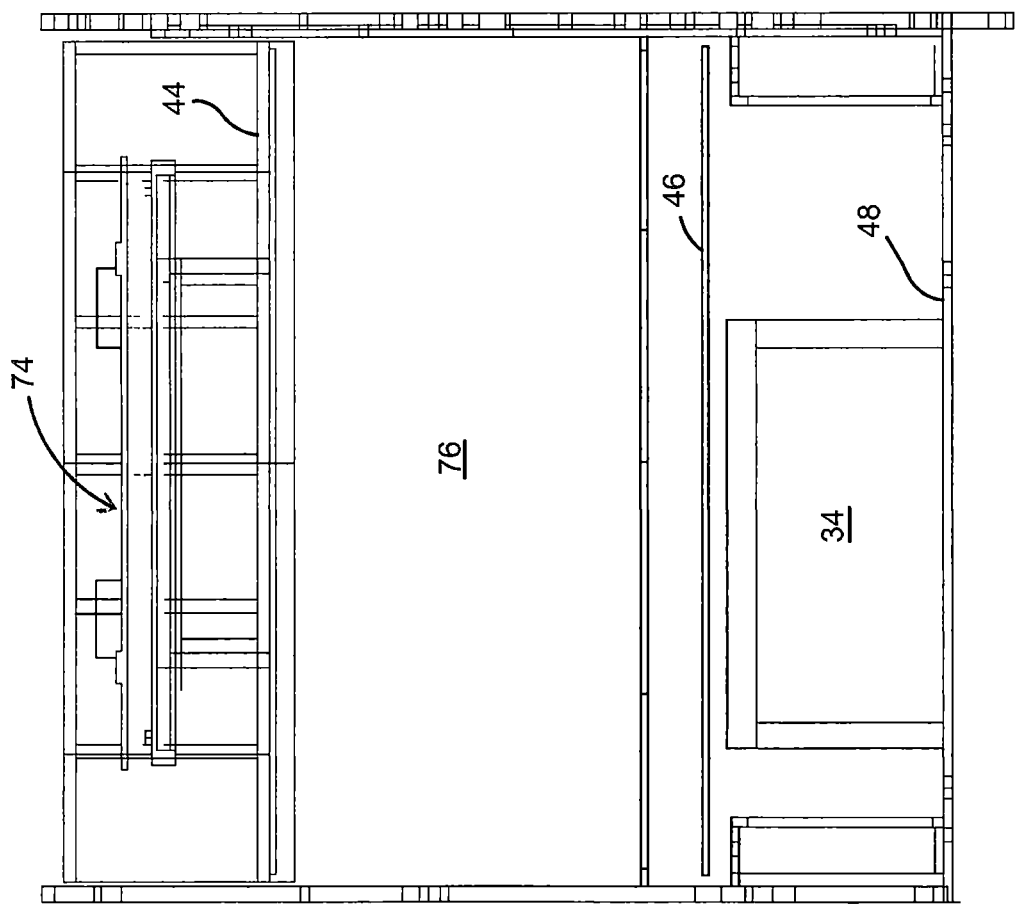
FIG. 7 is a cross-sectional view along line 6-6 of FIG. 6.
Figure 8:
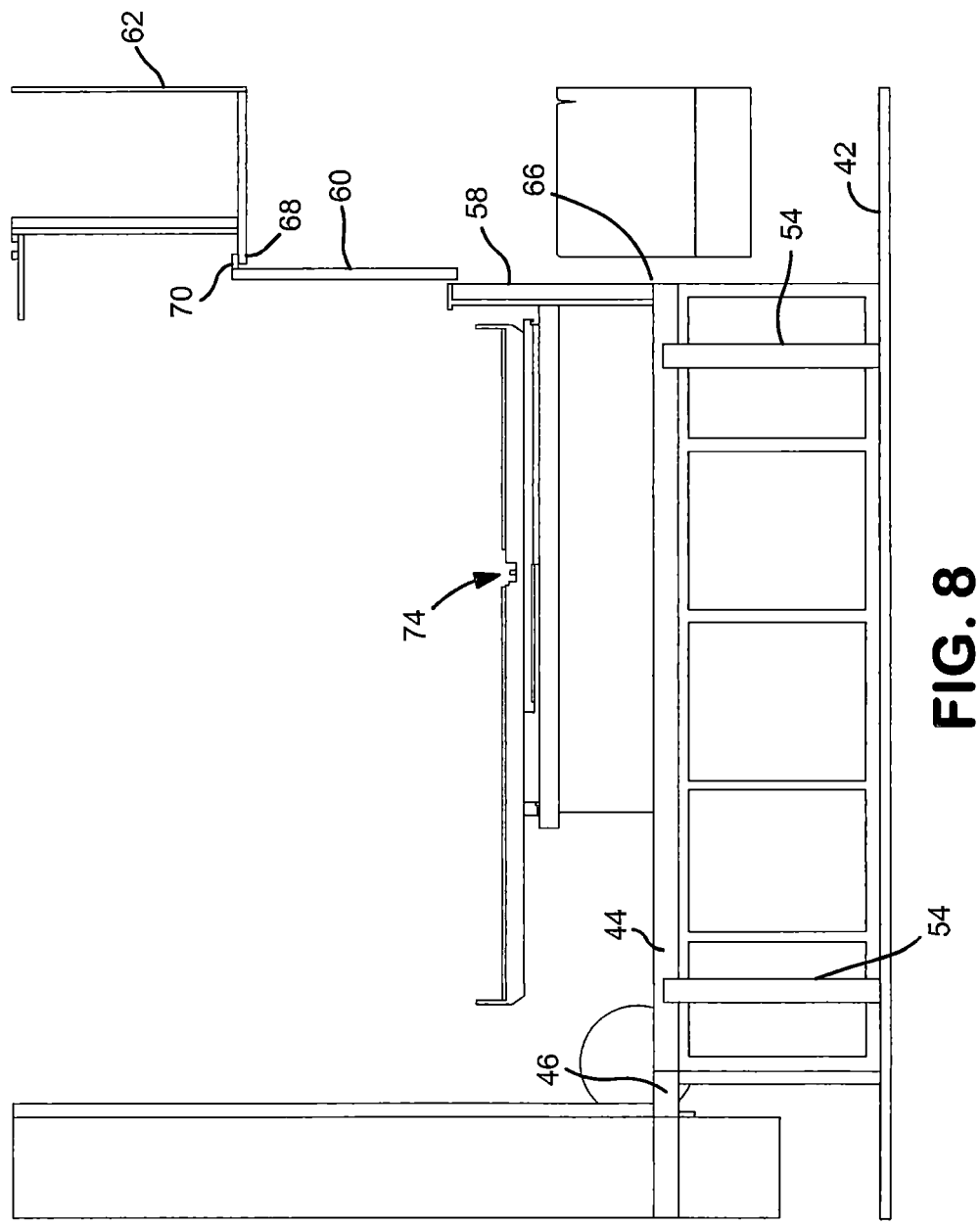
FIG. 8 is a cross-sectional, left side solid body view of a RV according to the teachings of the present invention, with the living quarters floor in the full down position.
Figure 9:
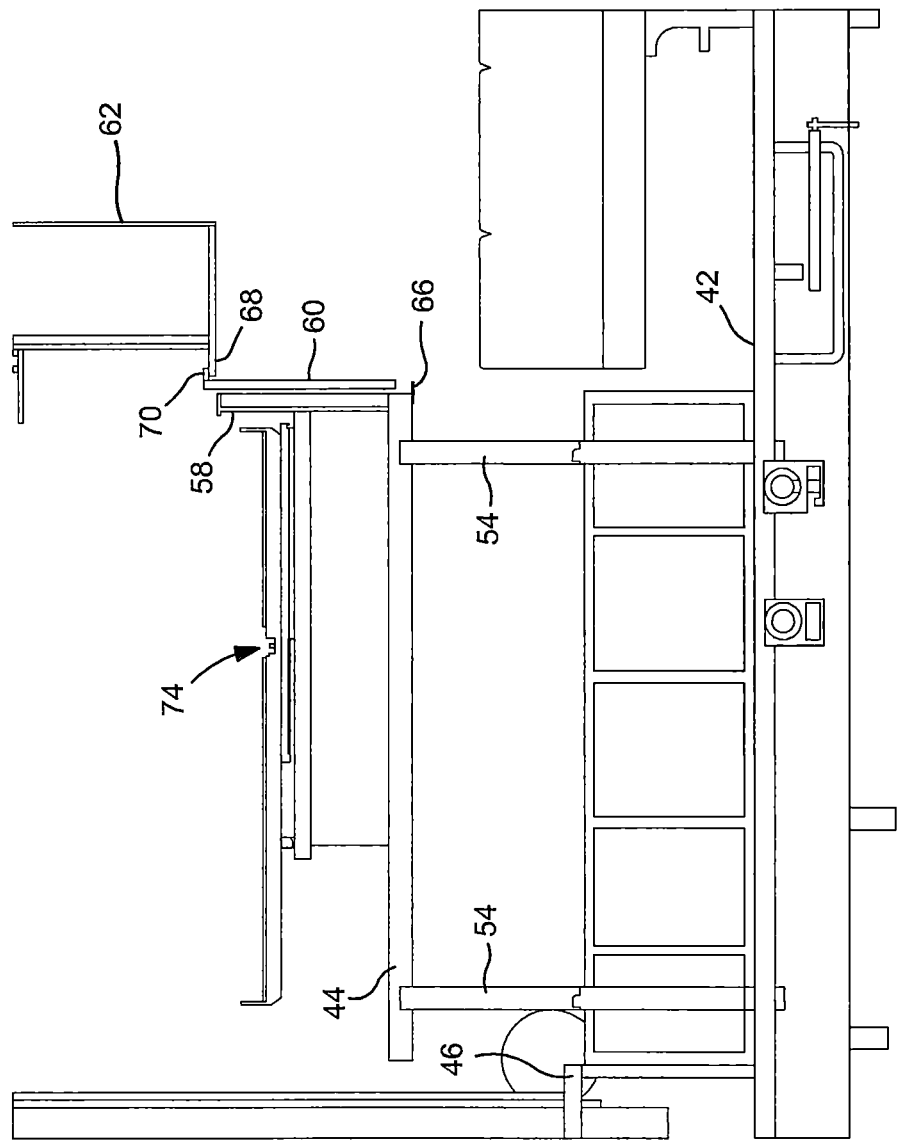
FIG. 9 is a cross-sectional, left side solid body view of the RV of FIG. 8, with the living quarters floor lifted to the loft position.
Figure 10:
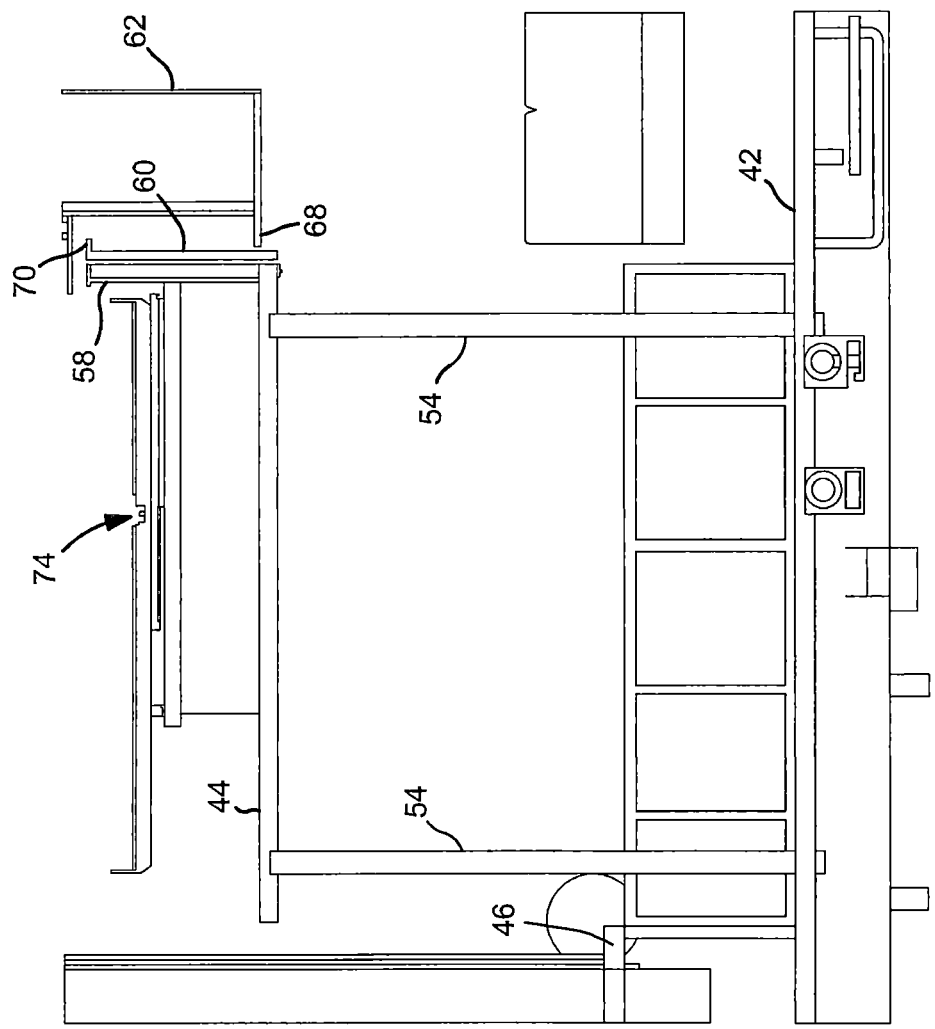
FIG. 10 is a cross-sectional, left side solid body view of the RV of FIG. 8, with the living quarters in the full up position.
Figure 11:
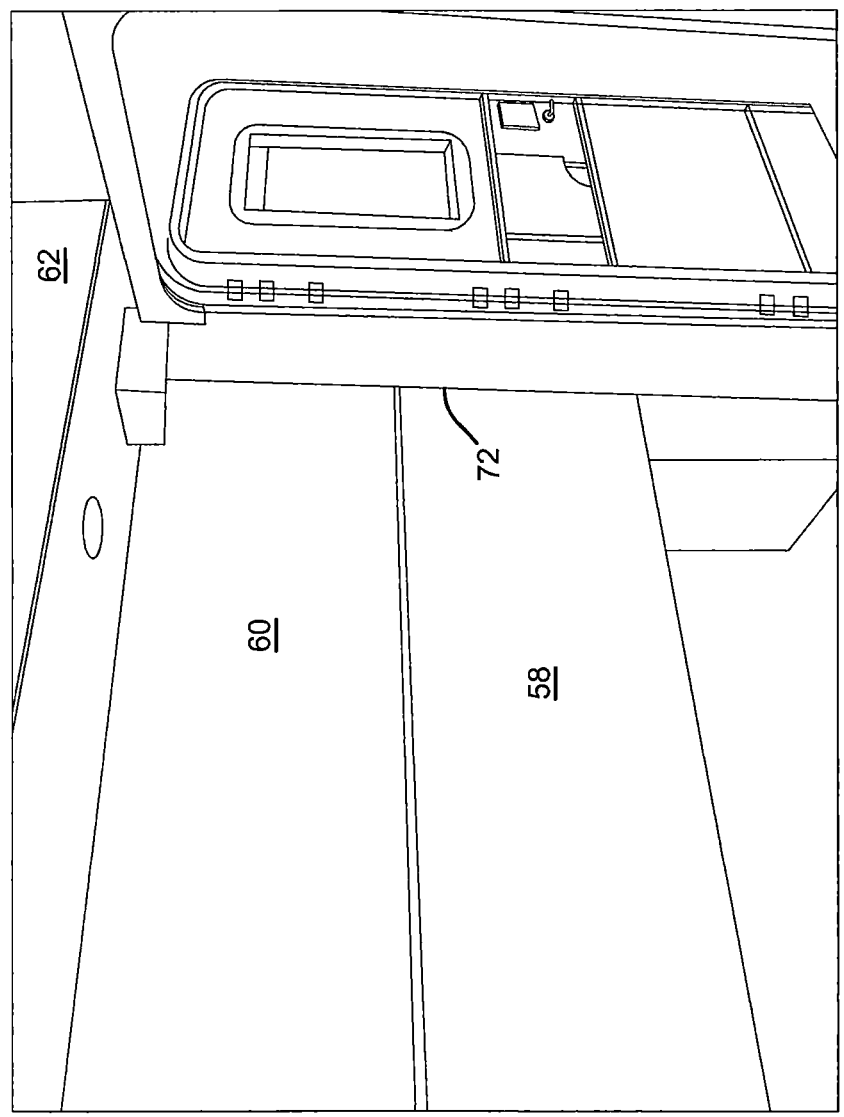
FIG. 11 is a photographic view from the left rear of the garage looking forward to the right side of the RV, of a RV incorporating the present invention, with the living quarters in the full down position.
Figure 12:
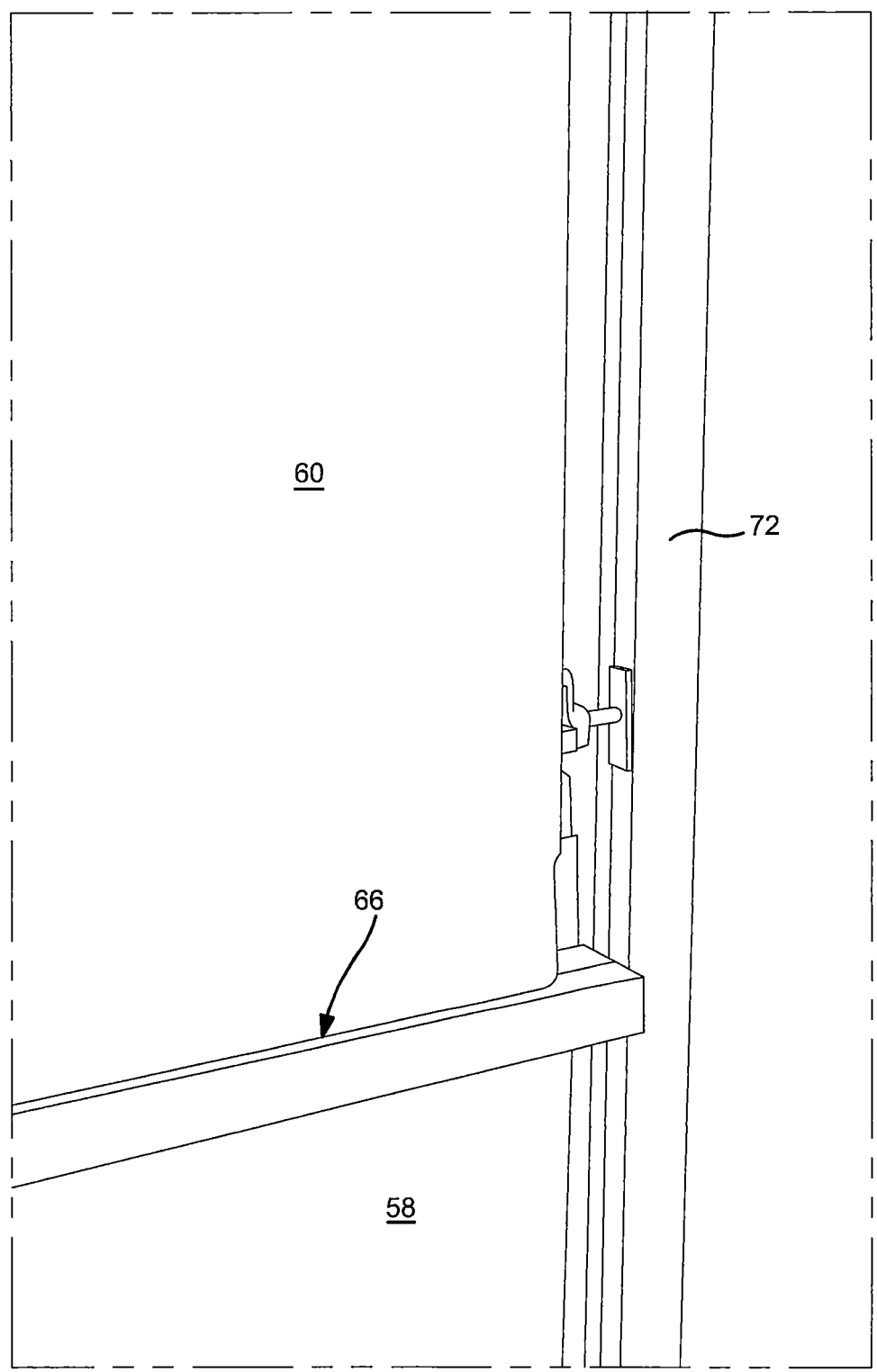
FIG. 12 is an enlarged photographic of a portion of FIG. 11, showing the sliding track used by the middle section of the multi-section wall.
Figure 13:
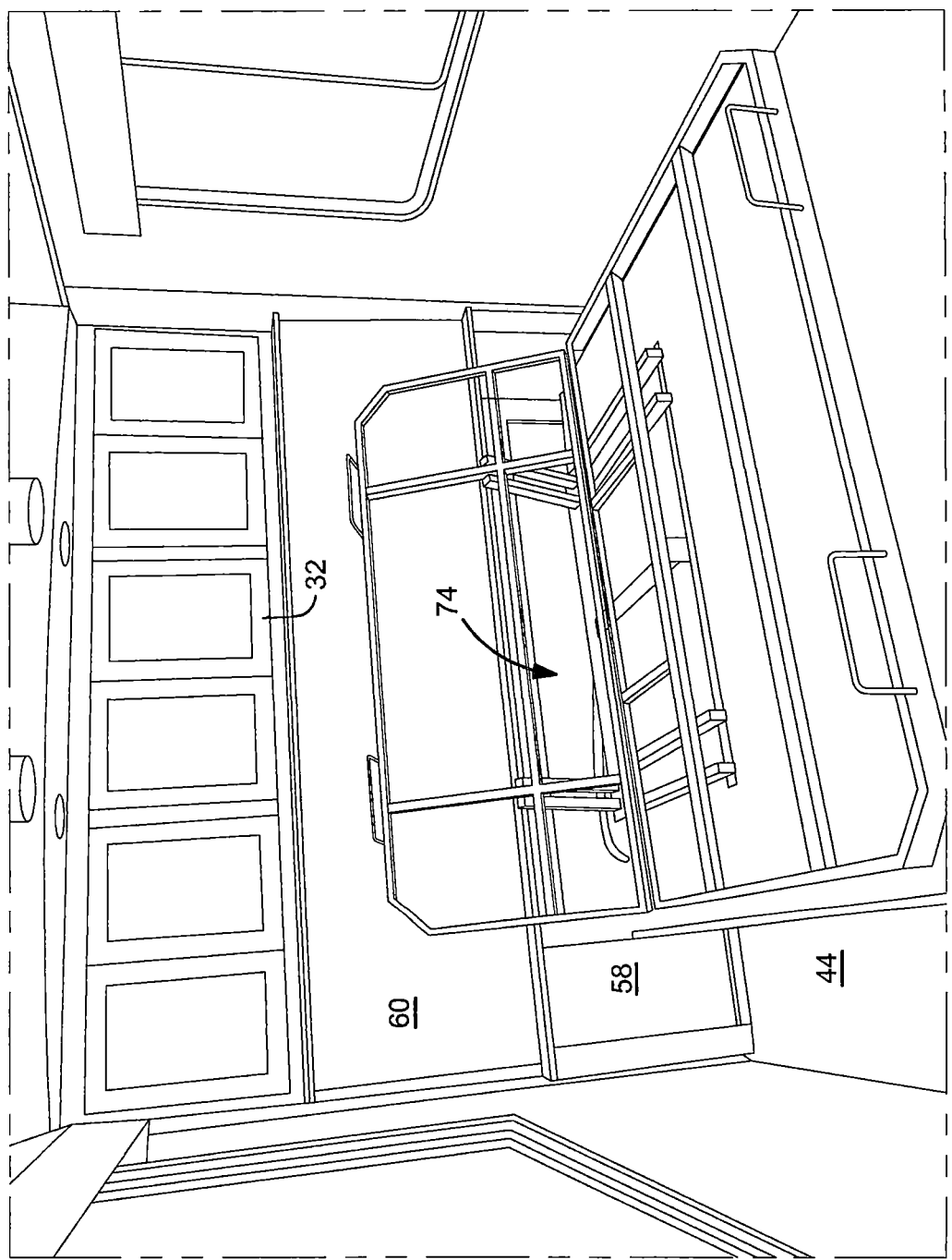
FIG. 13 is a photographic view from the right side of the living quarters looking rearward to the left side of the RV, of the RV of FIG. 11, with the living quarters in the full down position and the sofa/bed frame in the raised, sofa position.
Figure 14:
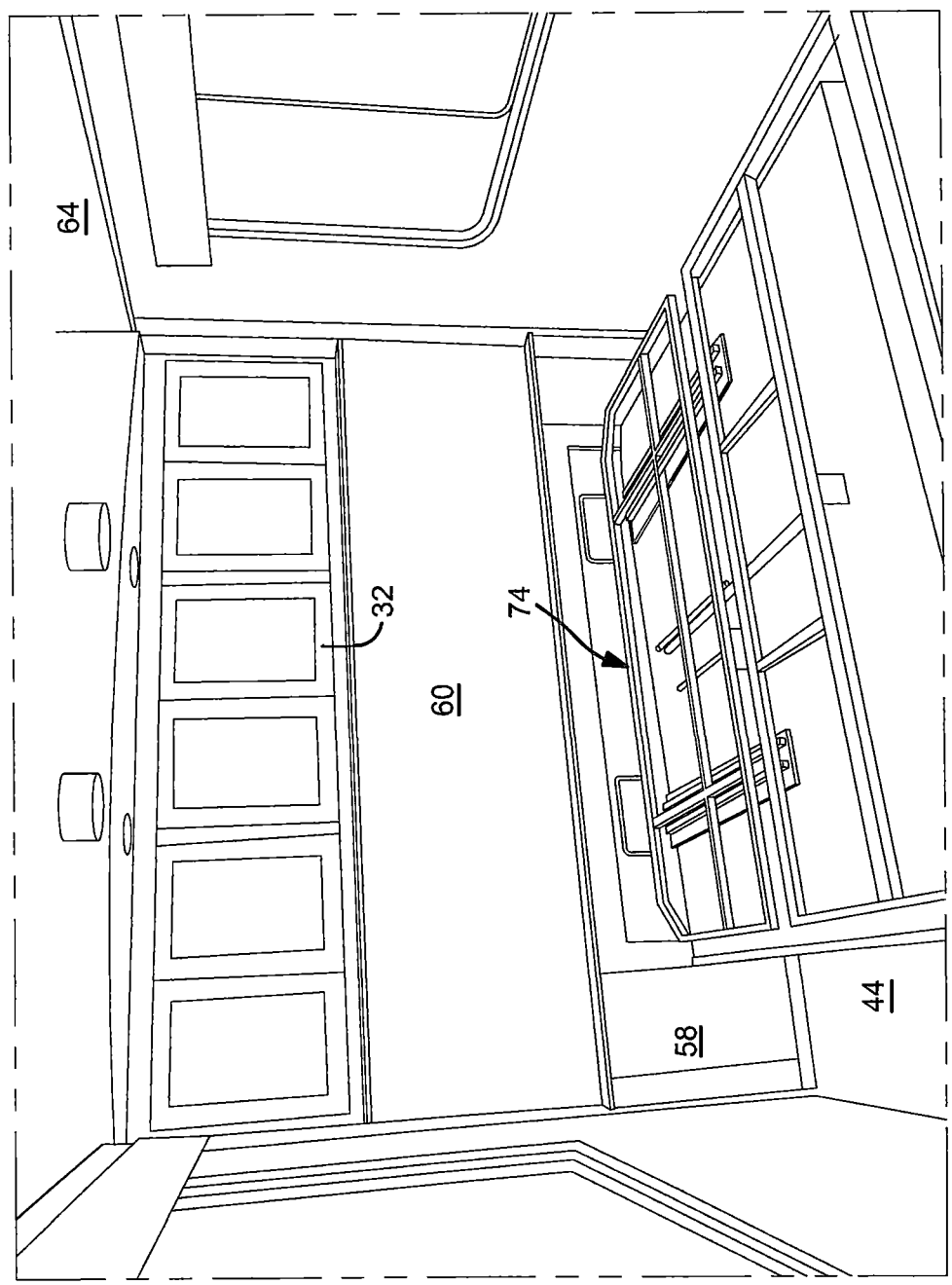
FIG. 14 is a photographic view corresponding to FIG. 13, with the sofa/bed frame in the lowered, bed position.
Figure 15:
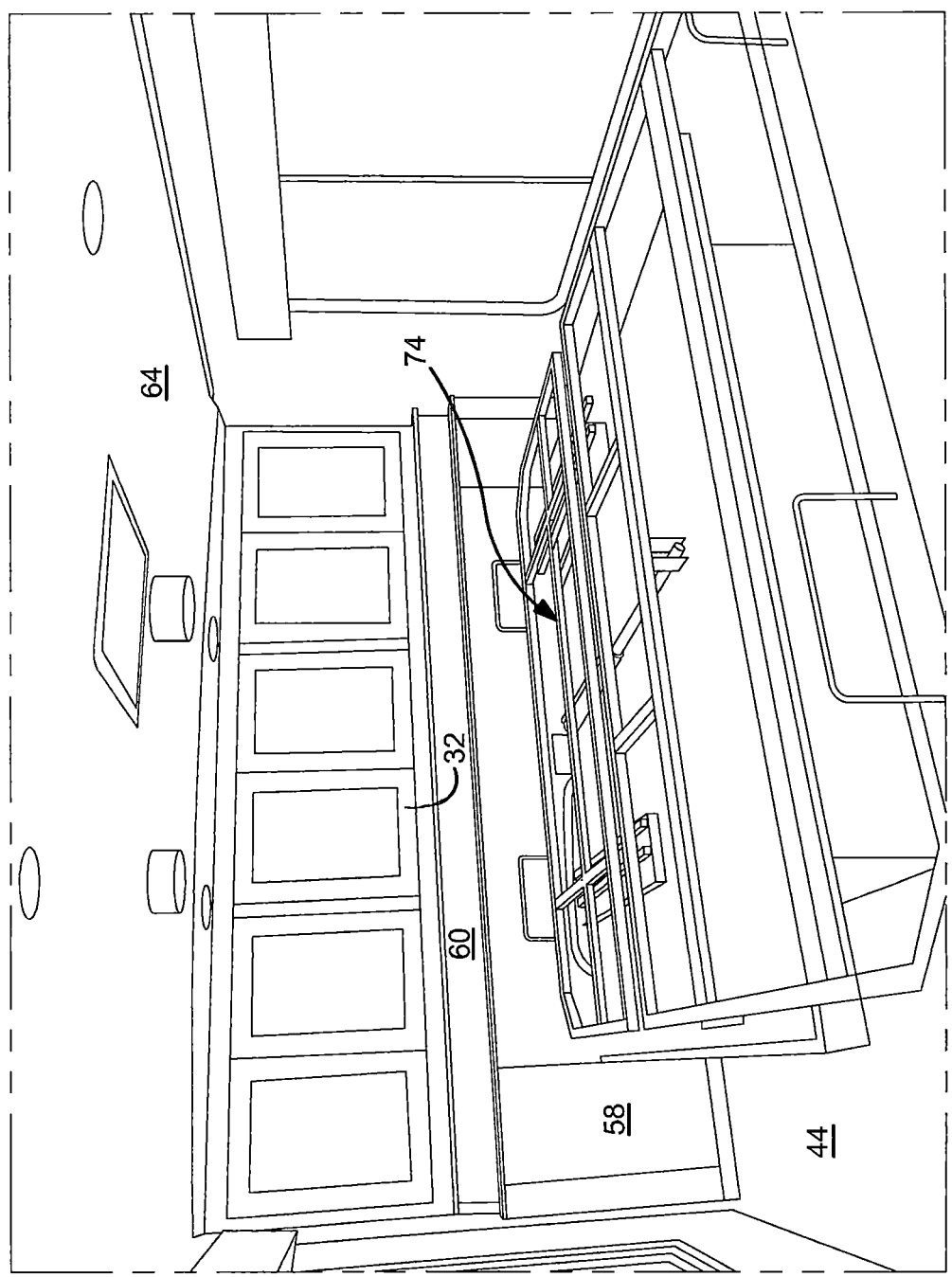
FIG. 15 is a photographic view corresponding to FIG. 13, with the living quarters floor raised to the loft position.
Figure 16:
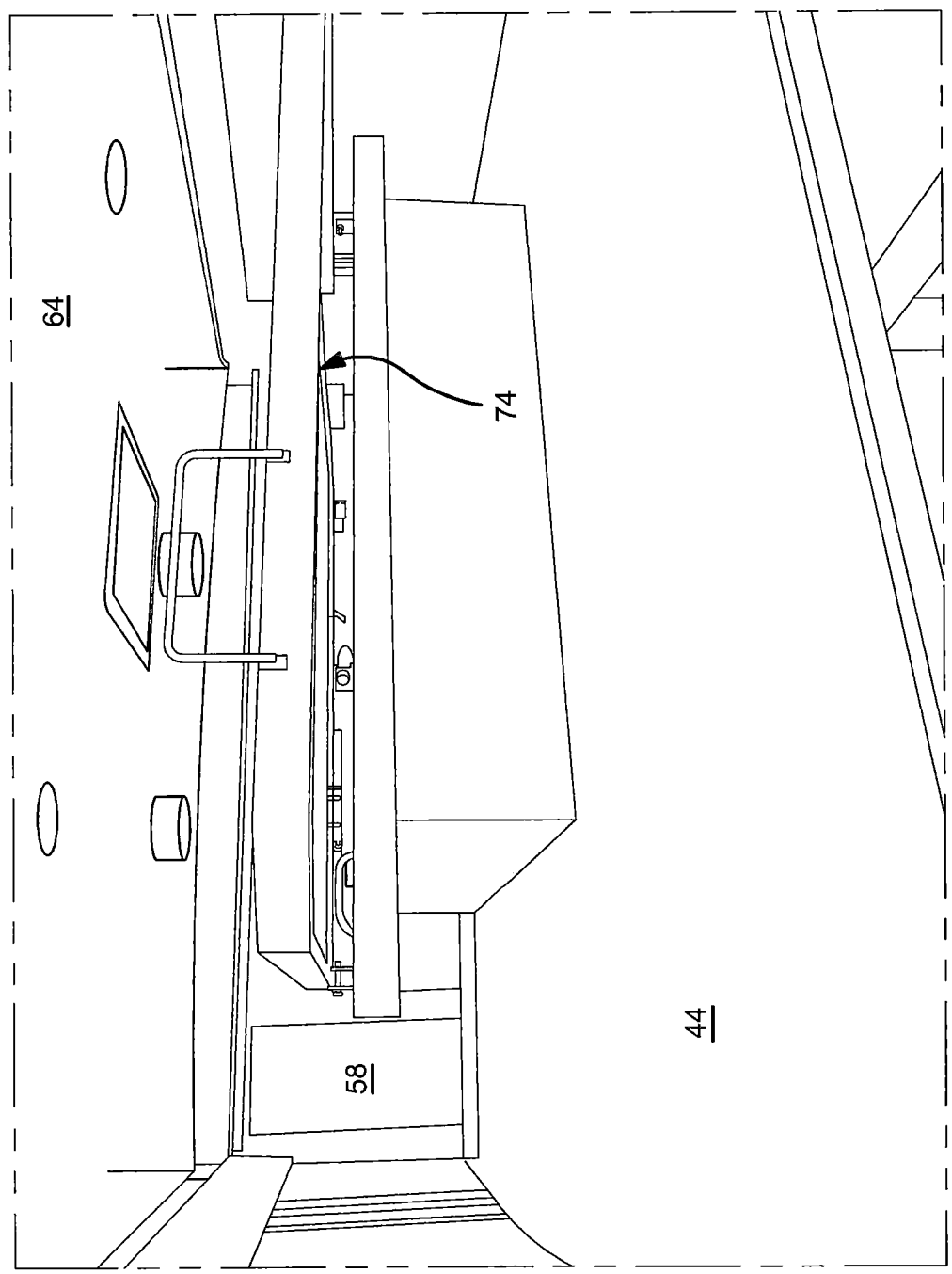
FIG. 16 is a photographic view corresponding to FIG. 13, with the living quarters raised to the full up position.
Figure 17:
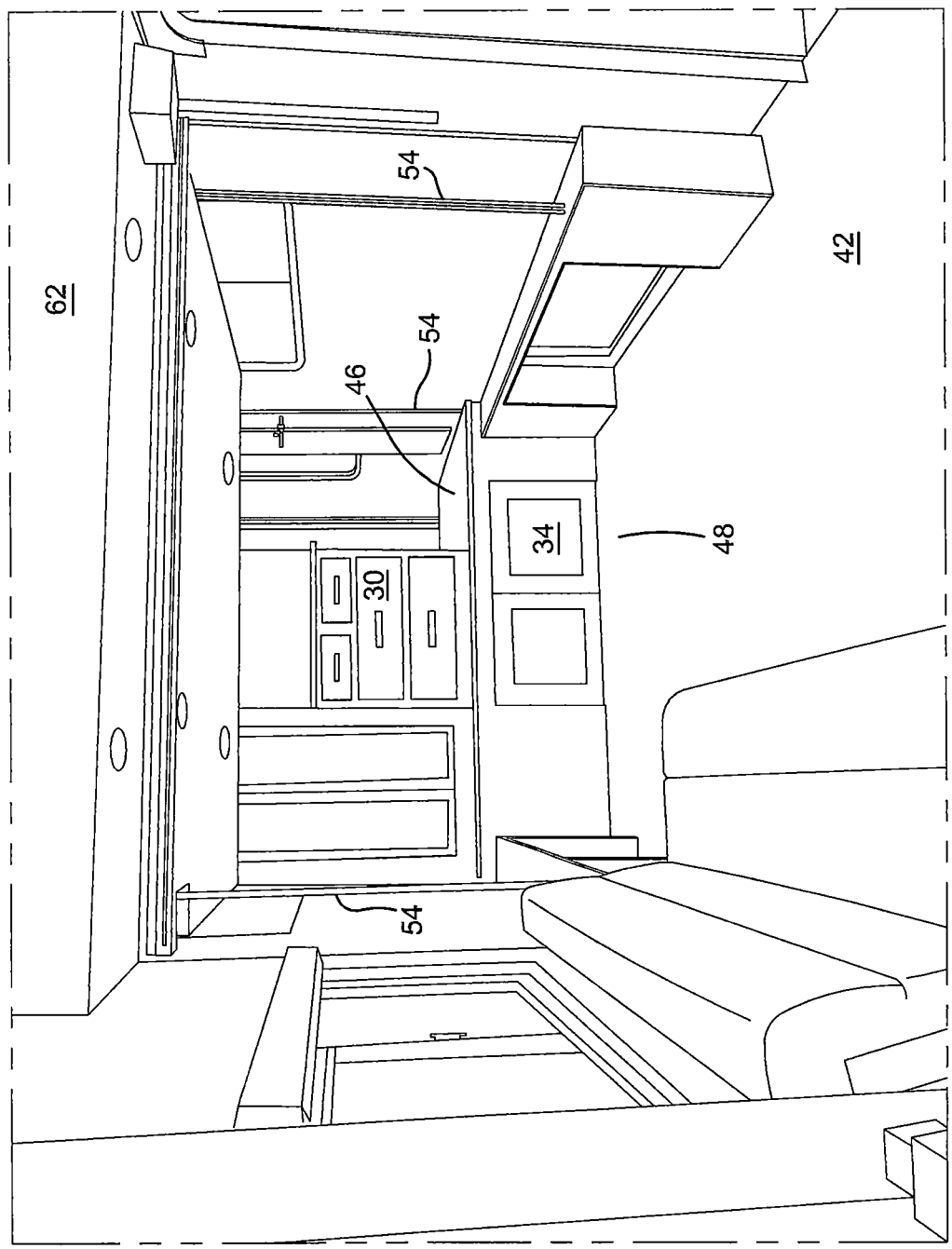
FIG. 17 is a photographic view from the left rear of the garage looking forward to the right side of the RV, with the living quarters floor in the position of FIG. 16, and the forward curtain removed.

The figures show schematically, and in a best mode version, embodiments of the present invention, as applied to a toy hauler RV, both generically and specifically. The drawings are not to precisely scale from one view to the next.

The following features are illustrated in the drawings by these numerals:

10. toy hauler type RV
12. RV wheel
14. RV towing hitch
16. Ramp door for opening and closing the garage entrance
18. Ramp door hinge connection
20. Garage area or room of the RV
22. Living quarters, such as a bedroom, adjacent to the garage area
24. Additional living quarters, such as a bathroom, living room, kitchen
26. Storage area under the living quarters
28. Additional storage area under the additional living quarters
30. Storage cabinet
32. Bedroom cabinet
34. Partition with access door
40. Multi-section wall, preferably with each section being rigid
42. Floor of the garage
44. Floor of the living quarters, elevated above the floor of the garage
46. Floor of the additional living quarters
48. Subfloor under the living quarters
50. Subfloor under the additional living quarters
52. Wall between the living quarters and the additional living quarters
54. Lifting apparatus for moving the living quarters floor up and down, preferably conventional in construction, such as from a pop-up tent camper roof lift apparatus
56. Control mechanism for lifting apparatus (preferably user actuatable), having conventional mechanism for sensing if the sofa/bed arrangement 74 is not fully down, and preventing operation of lifting apparatus 54 if that condition is sensed
58. Lower section of wall 40, preferably fixed to floor 44
60. Middle section of wall 40
62. Upper section of wall 40, preferably fixed with respect to ceiling 64
64. Ceiling 64
66. Ledge for engaging middle section 60 when lifting
68. Ledge for engaging middle section 60 to stop downward movement of that section under influence of gravity
70. Stop ledge for resting on ledge 68 to support middle section 60 against downward movement
72. Sliding track for retaining middle section 60 in proper placement during movement
74. Selectively moveable sofa/bed arrangement, including frame
76. Self-rolling curtain (preferably roller shade type, and being selectively removable by the user), extending across the floor width, for separating the living quarters from the additional living quarters when the living quarters is raised above the full down position.

Although the present invention has been shown and described herein with respect to certain preferred embodiments and alternative configurations, those were by way of illustration and example only. For example, while only three positions are shown for floor 44, the control mechanism 56 can allow the user to position the floor at any desired intermediate position, to allow as little or as much headroom in the loft mode as the user prefers. Further, while in the preferred embodiments, gravity will exert sufficient biasing force to allows section 60 to slide down into place, in other preferred embodiments, a spring biasing element can be mounted into sliding track 72 to urge section 60 downward. Also, while the wall 40 has been illustrated with only three sections, in other embodiments, additional or less sections can be used. In addition, while a forward access door has been described as part of partition 34, exterior access doors on each side of the RV can be disposed to give access to subfloor 48 at all times.

Accordingly, the spirit and scope of the present invention is intended to be limited only by the terms of the appended claims.

What is claimed is:

1. A reconfigurable RV comprising:
   at least a first and a second room inside of the RV,
   each room having a floor with a useable floor area and a floor height,
   wherein altering the floor height of the second interior room alters the useable floor area of the first interior room,
   wherein the floor of the first room is disposed at a first elevation,
   wherein the floor of the second room is disposed at a second elevation that is higher than the first elevation,
   wherein the RV includes a first subfloor disposed beneath the floor of the second room, that first subfloor being disposed at the first elevation,
   wherein the floor of the first room and the first subfloor are contiguous, and
   wherein the RV includes a second subfloor adjacent the first subfloor, that second subfloor being disposed at the first elevation.

2. The reconfigurable RV according to claim 1, wherein the first and second subfloors are separated by a selectively openable partition.

3. A reconfigurable RV comprising:
   at least a first and a second room inside of the RV,
   each room having a floor with a useable floor area and a floor height,
   wherein altering the floor height of the second interior room alters the useable floor area of the first interior room,
   wherein the floor of the first room is disposed at a first elevation,
   wherein the RV includes an apparatus for selectively raising or lowering the floor of the second room,
   also including a wall separating the first and second rooms, that wall having a selectively alterable vertical height, and wherein raising or lowering the floor of the second room causes the wall to reduce or extend its vertical height.

4. The reconfigurable RV according to claim 3, wherein raising or lowering the floor of the second room causes the sections of the wall to slide vertically with respect to each other.

* * * * *